United States Patent [19]

Hrovat et al.

[11] 4,093,682

[45] June 6, 1978

[54] PROCESS FOR THE PRODUCTION OF BLOCK-SHAPED FUEL ELEMENTS FOR HIGH TEMPERATURE REACTORS

[75] Inventors: Milan Hrovat, Rodenbach; Lothar Rachor, Hanau, both of Germany

[73] Assignee: Hobeg Hochtemperaturreaktor - Brennelement GmbH, Hanau, Germany

[21] Appl. No.: 768,633

[22] Filed: Feb. 14, 1977

[30] Foreign Application Priority Data

Feb. 14, 1976 Germany .............................. 2605975

[51] Int. Cl.² ................................................ G21C 3/38
[52] U.S. Cl. ................................ 264/0.5; 252/301.1 S
[58] Field of Search .................... 264/0.5; 252/301.1 S

[56] References Cited

U.S. PATENT DOCUMENTS

| 3,310,611 | 3/1967 | Zocher | 264/0.5 |
|---|---|---|---|
| 3,320,178 | 5/1967 | Dewell | 264/0.5 X |
| 3,329,745 | 7/1967 | La Grange | 264/0.5 |
| 3,445,437 | 10/1967 | Flack et al. | 264/0.5 |
| 3,708,559 | 1/1973 | Voice et al. | 264/0.5 |
| 3,716,605 | 2/1973 | Grimes et al. | 264/0.5 |
| 3,723,581 | 3/1973 | Boettcher et al. | 264/0.5 |
| 3,812,050 | 5/1974 | Steele | 264/0.5 X |

FOREIGN PATENT DOCUMENTS

2,541,956   4/1976   Germany .............................. 264/0.5

*Primary Examiner*—Peter A. Nelson
*Attorney, Agent, or Firm*—Cushman, Darby & Cushman

[57] ABSTRACT

Block fuel element for high temperature reactors are produced by hot molding of a granulated graphite material consisting of natural graphite powder, synthetic graphite powder, phenolformaldehyde binder resin and stearic acid as a lubricant together with fissile and fertile coated fuel particles to a hexagonal block shape with cooling channels for helium gas and subsequent heat treatment of the molded block to a max. temperature of about 2000° C. In order to displace the air from the die, an organic compound (air displacement agent) e.g., hydrocarbon, alcohol, phenol, aldehyde, ketone ether of amine is built into the granulated graphite material having a very low vapor pressure at room temperature which increases to about 760 Torr at molding temperature of about 180° C and condensed into a liquid phase while the forming pressure is applied.

18 Claims, No Drawings

4,093,682

PROCESS FOR THE PRODUCTION OF BLOCK-SHAPED FUEL ELEMENTS FOR HIGH TEMPERATURE REACTORS

BACKGROUND OF THE INVENTION

The present invention is directed to a process for the production of molded block fuel elements for gas cooled high temperature reactors by hot molding of a granulated graphite material together with fissile and fertile coated fuel particles using stearic acid as lubricant and a suitable organic compound as air displacement agent.

The molded block fuel element for high temperature reactors for short is also called monolith, is a hexagonal prism 700 to 1000 mm high with a width over the flats of, for example, 360 mm and a weight of, for example, about 150 kg. The monolith consists of a substantially fine crystalline graphite matrix of high heat conductivity, fuel regions with the same matrix and cooling channels. The fuel regions contain the fuel in the form of coated particles which are embedded in the graphite matrix. According to the construction of the fuel element the number of fuel regions customarily is 138 to 216 and the corresponding number of the cooling channels is 72 to 108. In contrast to a bored block and mechanically worked graphite fuel elements with loosely filled fuel inserts the fuel regions of the monolith are well bonded to the remaining graphite matrix so that both parts of the block, that is the fuel containing graphite matrix and the fuel free zone form a monolithic structure. Therewith a high cooling gas outlet temperature is reached at relatively low fuel temperature. Consequently the fission products release is reduced and therefore the monolith is not only suitable for steam cycle plants but also for direct cycle plants with helium turbines and particularly for nuclear process heat reactors. At the same time it fulfills the requirement of a fuel element with increased heavy metal content for a high temperature reactor-high converter since the fuel zones in contrast to those in bored blocks can be enlarged without thereby weakening the block structure. (Further advantages of the monolith are described in German Pat. No. 1,902,994.)

The monolith is generally produced from granulated graphite powder containing binder resin and coated fissile and/or fertile fuel particles by molding. As binder resins there are suited poly condensation products with the highest possible softening point as for example polyester (i.e., unsaturated polyesters) and epoxy resins (e.g., (diphenylepoxychlorohydrin resins). Preferably, however, there are used novolak type phenol-formaldehyde resins. As graphite powder there can be used either natural graphite or synthetic graphite or a mixture of both types of graphite. The principle for production is described in German Pat. No. 2,104,431 and related Hrovat U.S. application Ser. No. 577,054 filed May 13, 1975 and German Pat. No. 2,234,587 and related Huschka U.S. Pat. No. 3,985,844. The entire disclosures of the Hrovat U.S. application and Huschka U.S. patent are hereby incorporated by reference and relied upon.

A series of requirements are placed on the block fuel elements. The outer dimensions of the hexagonal prism as well as the diameter and the positions of the numerous cooling channels and fuel regions produced by pressing only permit a deviation of several tenths of a millimeter together and for the longitudinal axis of the block from the nominal values. Since the coating of the fissile and fertile particles must remain intact in the production of the fuel element the molding pressure is also limited.

In spite of this limitation of the molding pressure the graphite matrix must have high geometrical density, good strength properties, high heat conductivity, the least possible modulus of elasticity, a small thermal expansion coefficient and a good crystalline arrangement. Besides it must not have disadvantageous property gradients in either the axial or radial block direction. All of these properties must be so adjusted to each other that the sum of the stresses occurring in the fuel element consisting of primary stresses (caused by the handling in loading the reactor), thermal stresses and radiation induced stresses during the total residence time in the reactor do not endanger the mechanical integrity of the block.

Besides the reactor operation requires that there be produced blocks with different fissile and fertile material loadings. In spite of different loading which strongly influence the amount of shrinkage in the heat treatment, the fuel element must come out without change in dimension.

Furthermore, a smooth cooling channel surface is required of the fuel element in order to obtain a low pressure drop of the helium gas during the reactor operations.

According to the preciously known molding processes there could not be produced block-fuel elements completely meeting requirements. The air contained in a loose charge before the pressing is disadvantageous. It is compacted to the center of the block during the course of the molding process and subsequently is pressed in there. The resilience of this compressed air in the initial phase of the subsequent carbonization leads to a change in shape and a weakening of the block structure, which in this phase is still very impermeable with relatively low strength. After the carbonization the block consequently exhibits impermissible property gradients toward the middle as well as a barrel shaped swelling of about 1 mm.

The construction of the fuel elements for a power reactor provides for the purpose of optimization of the use of fuel according to the block position and the residence time of different heavy metal loadings per fuel element in the period of reactor operation. The amounts of heavy metal per block-fuel element for a reactor differ very strongly from each other and customarily lie in the range between a minimum charge of 3 kg and a maximum charge of 20 kg per block. If one proceeds from the point that uranium and thorium are present in the form of separate fissile and fertile coated fuel particles then the above-mentioned amounts of heavy metal correspond to a particle content of 5 – 32 kg. Since the coated particles in contrast to the graphite matrix do not shrink during the heat treatment it is obvious that after the carbonization the highly loaded blocks in comparison to the low loaded blocks must have a larger diameter. The measurements show that in the required range dimension deviations of the block diameter occur up to about 2 mm. In order to compensate these deviations according to the present state of the fabrication for each heavy metal loading its own set of tools when necessary which besides increased investment costs had as a result additional operating costs with the change of tools.

It was therefore the object of the invention to avoid the described technological difficulties and to make possible an economical manufacture of gradient free block-fuel elements with different loadings and very good accuracy in size in the same tool, independent of fissile and fertile fuel loading of the block without endangering the mechanical integrity of the coated fuel particles.

SUMMARY OF THE INVENTION

The problem was solved by the invention by incorporating into the granulated graphite material an organic compound which is a hydrocarbon or substituted hydrocarbon and whose vapor pressure increases from a very low value at room temperature, e.g., below 10 Torr at 20° C, to about 760 Torr at pressing or molding temperature and which is again condensed into a liquid phase already at moderate forming pressure in the molding step. The pressing temperature is usually between 100° and 200° C and the forming pressure is usually about 80 to 150 bar.

During the heating to the pressing temperature the air contained in the assembled steel die is displaced by vapor formation of the hydrocarbon (or substituted hydrocarbon additive) and therewith the pressure stress in the block as a result of the air expansion in its critical impermeable range is prevented in the subsequent carbonization. The air displacing agent which is condensed into a liquid phase by molding vaporizes later during the carbonization at a temperature in which the graphite matrix already begins to become gas permeable and can be allowed to escape without pressure so that no swellings and other deformations can arise.

The content of air displacing agent is adjusted according to the pore and intermediate space of the pre-pressed block charged with heavey metal. Advantageously the content of air displacing agent is within the range of 0.2 to 2 weight %.

For the production of a homogeneous molding powder mixture the stearic acid necessary as a lubricant is melted, a hydrocarbon or substituted hydrocarbon, for example octanol, added and a portion of about 2 to 10 weight % of the graphite molding powder required to produce a block stirred into the melt and then the melt is cooled. The goods which are now capable of being ground are ground and dry mixed into the rest of the molding powder charge.

As air displacing agent there can be employed in general aromatic, cycloaliphatic and aliphatic hydrocarbons, alcohols, phenols, aldehydes, ketones, ethers and amines insofar as the boiling point is near the pressing temperature, the vapor pressure is very low at room temperature and the solubility for the phenol-formaldehyde resin or other binder is low. As examples there can be used nonane, decane, decalin, cumene, mesitylene, amyl alcohol, hexanols, e.g., hexanol-1 and hexanol-2, heptanols, e.g., heptanol-1, octanols, e.g., octanol-1 and octanol-2, nonanols, e.g., nonanol-1, cyclohexanol, benzyl alcohol, cresols, e.g., m-cresol or cresylic acid, dibutyl ketone, cyclohexanone, mesityl oxide, dibutyl ether, toluidine, n-heptaldehyde and benzaldehyde. Especially advantageous are aliphatic alcohols, e.g., alkanols, particularly the two hexanol isomers hexanol-1 and hexanol-2 and the two octanol isomers octanol-1 and octanol-2. The insertion of hexanol or octanol depends on the pressing temperature and this in turn depends on the softening point and the viscosity of the binder resin used. If in the molding the temperature is fixed at 135° – 140° C then hexanol-2 with a boiling point of 139.9° C is especially well suited. At higher molding temperature which is in the range between 180° – 200° C octanol-2 with a boiling point of 178.5° C or octanol-1 with a boiling point of 195.2° C is preferred. Both the alcohols hexanol and octanol and their isomers are distinguished by the relatively low vapor pressure of below 10 Torr at room temperature.

The addition of octanol as air displacing agent leads to the sought uniform shrinkage of the block matrix over the total length of the block in the carbonization. Since the coated fuel particles in contrast to the block matrix do not shrink, different dimensions would result between the blocks loaded with different heavy metal content which would exceed the permitted limits of dimensional tolerances. It has now been shown that this can be avoided and also prevented, to use for each fuel element block loading its own set of tool, if the shrinkage of graphite matrix of all the blocks being loaded below the maximum loading is reduced by carbonization of a small portion of the resinated graphite matrix powder used for preparation of the granulated graphite material. The addition of a small amount of the carbonized matrix powder does not change the physical properties of block graphite matrix recognizably. According to the invention depending on the heavy metal loading in the block 1 to 10 weight % of the matrix powder is carbonized at about 800° C with exclusion of air. The portion of matrix powder added to the mixture of molten stearic acid and octanol is entirely or partially replaced by this carbonized matrix powder and the granulate material produced from this mixture. The thermally pretreated matrix powder is distinguished from the untreated powder by a more elastic behavior in the pressing. These powder properties promote a resiliency of the block matrix and therewith act against shrinking. Therewith the dimensions of the differently loaded blocks whose heavy metal content lies over the required range of 3 to 25 kg can be produced with an exactitude of $\mp$ 0.25 mm.

As fuel materials there can be used for example oxides or carbides of U 235, U 233 and fissionable plutonium isotopes and as fertile materials the oxides and carbides of U 238 and/or Th 232.

In addition to phenol-formaldehyde novolaks other suitable binders include the previously mentioned polyesters and epoxy resins as well as xylenol or cresol-formaldehyde resins or furfuryl alcohol resins. The binder resin is usually employed in an amount of 10 to 30% of the graphite by weight.

Unless otherwise indicated all parts and percentages are by weight.

The following examples further expalin the process of the invention.

DESCRIPTION OF THE PREFERRED EMBODIMENTS

EXAMPLE 1

Production of Block-Fuel Elements with a Heavy Metal Content of 18 kg/Block

By kneading, drying and grinding to a particle size of < 1 mm a matrix powder was produced from a mixture of 64 weight % natural graphite powder, 16 weight % graphitized petroleum coke powder and 20 weight % of phenol-formaldehyde binder resin dissolved in methanol. As natural graphite powder there served a nuclear pure natural graphite with an ash content of 150 ppm, an average particle diameter of 15 $\mu$ and a high crystallinity (crystallite size $L_c$ = 1000 A), as graphitized petroleum coke powder a needle coke graphitized at 3000°

C with extremely low ash content (ash < 10 ppm), an average particle diameter of 25 μ and a crystallite size $L_c$ of 600 A.

There were mixed into the matrix powder 1 weight % of stearic acid (lubricant) and 0.4 weight % of octanol-1 with a density of 0.815 g/cm$^3$ (displacing agent). The stearic acid was melted to produce a homogeneous mixture, the octanol added and a portion up to 10 weight % of the matrix powder used stirred into the melt and the mixture allowed to cool. The product which was now capable of being ground, after comminution to a particle size < 1 mm, was dry mixed into the remainder of the powder charge and granulate produced therefrom with a particle size $0.314 < d < 3.14$ mm.

Next 96 kg of granulate were preliminarily molded in a hexagonal die at room temperature to the fuel free block framework with a relatively low density of 1.2 g/cm$^3$ with a molding pressure of 50 bar. The die contained 210 polished metal rods for the formation of channels (72 for the cooling and 138 for receiving fuel). After removal of the shaping rods from the fuel positions the block was loaded with a homogeneous mixture consisting of 21 kg of granulated graphite material, 28 kg of fertile and 5 kg of fissile coated fuel particles. The fertile particles were made of ThO$_2$ coated with pyrolytic carbon and fissile particles were made of UC$_2$ coated with pyrolytic carbon and silicon carbide. The method for the production of such a homogeneous mixture is described in German Offenlegungsschrift No. 2,333,094, the entire disclosure of which is hereby incorporated by reference and relied upon. The finished loaded block was heated with the hexagonal die to 180° C and at a pressure of 120 bar pressed to a matrix density of 1.92 g/cm$^3$. After cooling to a temperature of 80° C the block was ejected from the die at 90 bar. In a two step heat treatment the block was next heated in argon purge to 800° C and thereby the binder was carbonized. Subsequently the block was heated thoroughly in a vacuum at $10^{-3}$ Torr and a maximum temperature of 1950° C. For comparison there was prepared a block fuel element without the addition of octanol while holding all of the rest of the production conditions the same. Following Table 1 clearly shows that there is produced considerably better block properties using the process of the invention.

TABLE 1

| Property | | With Octanol | Without Octanol |
| --- | --- | --- | --- |
| Width across the flats (mm) | Top | 360.1 | 361.2 |
| | Middle | 360.2 | 362.8 |
| | Bottom | 360.0 | 360.8 |
| Density (g/cm$^3$) | Top | 1.76 | 1.70 |
| | Middle | 1.76 | 1.66 |
| | Bottom | 1.78 | 1.72 |
| Tensile strength (kp/cm$^2$) | Radial | 84 | 55 |
| | Axial | 63 | 42 |
| Heat conductivity (W/cmK) at 20° C | Radial | 0.81 | 0.62 |
| | Axial | 0.55 | 0.39 |
| Thermal expansion (1/K x 10$^{-6}$) 20-500° C | Radial | 2.4 | 2.6 |
| | Axial | 3.8 | 4.5 |

EXAMPLE 2

Production of Block-Fuel Elements with Precarbonized Matrix Powder Portion and Low Heavy Metal Loading (3 kg/Block)

Keeping constant the starting components and the composition the matrix powder was produced analogously to Example 1. 10 weight % of the molding powder was carbonized at 800° C and stirred into the melt consisting of stearic acid and octanol-1. All the remaining process steps remained unchanged.

For comparison a second block-fuel element was produced with the same heavy metal content but without the addition of the carbonized molding powder portion. The nominal value for width across the flats was 360 mm.

After the heat treatment the following values were determined on the blocks.

TABLE 2

| | | With Carbonized Portion | Without Carbonized Portion |
| --- | --- | --- | --- |
| Width across the flats (mm) | Top | 360 | 358.3 |
| | Middle | 360.1 | 358.5 |
| | Bottom | 359.9 | 358.2 |

The process can comprise, consist essentially of or consist of the steps set forth and the composition employed can comprise, consist essentially of or consist of the materials set forth.

By room temperature is meant a temperature of about 20° C.

The boiling points of the air displacing agents specifically mentioned range from 131° C for mesityl oxide to 212° C for nonanol-1.

What is claimed is:

1. In a process for the production of a hexagonally shaped block-fuel element for a gas cooled high temperature reactor by hot molding a granulated graphite material consisting essentially of a mixture of natural graphite, synthetic graphite and binder resin together with fissile and fertile coated fuel particles together with stearic acid as a lubricant to form molded blocks and wherein the blocks are subsequently heat treated and wherein the outer hexagonal shape of the block fuel element and the cooling gas channels are produced by molding, the improvement comprising incorporated into the matrix powder prior to molding an organic compound having a very low vapor pressure at room temperature and a vapor pressure of about 760 Torr at the molding temperature, of not over 200° C, said organic compound again being liquifiable under moderate pressure at the molding temperature.

2. A process according to claim 1 wherein the organic compound has a vapor pressure less than 10 Torr at room temperature.

3. A process according to claim 1 wherein the organic compound has a boiling point of 131° to 212° C.

4. A process according to claim 3 wherein the pressing temperature is from 135° to 200° C.

5. A process according to claim 1 wherein the organic compound is a hydrocarbon, alcohol, phenol, amine, aldhyhde, ketone or ether.

6. A process according to claim 5 wherein the amount of organic compound is 0.2 to 2 weight %.

7. A process according to claim 6 wherein the organic compound is an aliphatic alcohol.

8. A process according to claim 7 wherein the aliphatic alcohol is an alkanol of 5 to 9 carbon atoms.

9. A process according to claim 8 wherein the alkanol is a hexanol or octanol.

10. A process according to claim 9 wherein the alkanol is hexanol-1, hexanol-2, octanol-1 or octanol-2.

11. A process according to claim 10 wherein prior to the granulating there are included the steps of preparing a mixture of molten stearic acid, the organic compound and 2 to 10% by weight of all of the matrix powder, cooling this mixture, grinding and homogeneously dry mixing the resultant powder with the remainder of the resinated matrix powder.

12. A process according to claim 11 wherein the alkanol is hexanol-1 or octanol-1.

13. A process according to claim 6 wherein prior to the granulating there are included the steps of preparing a mixture of molten stearic acid, the organic compound and 2 to 10% by weight of all the matrix powder, cooling this mixture, grinding and homogeneously mixing the powder formed with the remainder of the matrix powder.

14. A process according to claim 1 wherein prior to the granulating there are included the steps of preparing a mixture of molten stearic acid, the organic compound and 2 to 10% by weight of all the matrix powder, cooling this mixture, grinding and homogeneously mixing the powder formed with the remainder of the molding powder.

15. A process according to claim 14 wherein the block is a hexagonal prism having a height of 700 to 1000 mm, a width over the flats of 360 mm and the heavy metal content is between 3 and 20 kg per block.

16. A process according to claim 15 wherein the fuel element has a loading of fissile and fertile coated fuel particles below the maximum, and there are included the steps of heating 1 to 10% of the matrix powder consisting essentially of natural graphite, synthetic graphite and binder resin to 800° C with exclusion of air, to carbonize the resin and adding this carbonized mixture in place of at least a portion of the molding powder added to the molten stearic acid and organic compound.

17. A process according to claim 15 wherein the block contains 72 to 108 cooling channels.

18. A process according to claim 1 wherein the binder resin is a phenol formaldehyde resin.

* * * * *